US 12,479,407 B2

(12) United States Patent
Smith et al.

(10) Patent No.: US 12,479,407 B2
(45) Date of Patent: Nov. 25, 2025

(54) REVERSE ASSIST SYSTEM FOR SADDLE RIDING VEHICLE AND METHOD THEREOF

(71) Applicant: Honda Motor Co., Ltd., Tokyo (JP)

(72) Inventors: Shane R. Smith, Zanesfield, OH (US); Brandon Ricketts, Marysville, OH (US)

(73) Assignee: Honda Motor Co., Ltd.

( * ) Notice: Subject to any disclaimer, the term of this patent is extended or adjusted under 35 U.S.C. 154(b) by 244 days.

(21) Appl. No.: 18/365,119

(22) Filed: Aug. 3, 2023

(65) Prior Publication Data
US 2025/0042375 A1 Feb. 6, 2025

(51) Int. Cl.
| | |
|---|---|
| *B60T 8/00* | (2006.01) |
| *B60T 7/12* | (2006.01) |
| *B60T 8/17* | (2006.01) |
| *B60T 8/32* | (2006.01) |
| *B60T 8/58* | (2006.01) |
| *B62J 50/21* | (2020.01) |
| *B62K 11/00* | (2006.01) |

(52) U.S. Cl.
CPC ............. *B60T 8/58* (2013.01); *B60T 7/12* (2013.01); *B60T 8/1706* (2013.01); *B60T 8/3205* (2013.01); *B62J 50/21* (2020.02); *B60T 2201/03* (2013.01); *B60T 2250/00* (2013.01); *B60T 2250/04* (2013.01); *B62K 11/00* (2013.01)

(58) Field of Classification Search
CPC . B60T 8/58; B60T 7/12; B60T 8/1706; B60T 8/3205; B60T 2201/03; B60T 2250/00; B60T 2250/04; B62J 50/21; B62K 11/00
See application file for complete search history.

(56) References Cited

U.S. PATENT DOCUMENTS

| | | | |
|---|---|---|---|
| 6,457,381 B1 | 10/2002 | Nonaka et al. | |
| 7,946,373 B2 | 5/2011 | Gibson | |
| 9,682,745 B2 | 6/2017 | Sakamoto et al. | |
| 9,963,044 B2 | 5/2018 | Koizumi | |
| 2017/0008421 A1* | 1/2017 | Koizumi | B60L 3/0061 |

(Continued)

FOREIGN PATENT DOCUMENTS

| | | |
|---|---|---|
| CN | 206579764 U | 10/2017 |
| EP | 3835182 A1 | 6/2021 |

(Continued)

*Primary Examiner* — Truc M Do
(74) *Attorney, Agent, or Firm* — Joshua Freier; American Honda Motor Co., Inc.

(57) ABSTRACT

A reverse assist system for a saddle riding vehicle includes a switch configured to be displaced between a first position and a second position. The switch is displaced to the second position to activate a reverse assist strategy. The reverse assist system also includes a sensing unit to determine at least one of a speed or an acceleration of the saddle riding vehicle, and a controller arranged in communication with the switch, the sensing unit, and a front brake. The controller is configured to activate the reverse assist strategy in response to the displacement of the switch to the second position, and control the front brake to control braking of a front wheel based on at least one of the speed or the acceleration of the saddle riding vehicle to assist a rider to reverse the saddle riding vehicle according to the reverse assist strategy.

14 Claims, 4 Drawing Sheets

(56) References Cited

U.S. PATENT DOCUMENTS

| | | | | |
|---|---|---|---|---|
| 2018/0154729 A1* | 6/2018 | Awano | ............... | B62K 25/04 |
| 2020/0290699 A1* | 9/2020 | Haraguchi | ............ | F16D 65/183 |
| 2023/0139530 A1* | 5/2023 | Wismann | ............... | B62K 11/14 |
| | | | | 180/220 |

FOREIGN PATENT DOCUMENTS

| | | | |
|---|---|---|---|
| EP | 3744560 | B1 | 6/2022 |
| JP | 2961430 | B2 | 10/1999 |
| JP | 2010120597 | A | 6/2010 |
| WO | 2020090231 | A1 | 5/2020 |

* cited by examiner

REVERSE ASSIST SYSTEM FOR SADDLE RIDING VEHICLE AND METHOD THEREOF

BACKGROUND

The disclosed subject matter relates generally to a saddle riding vehicle. More particularly, the disclosed subject matter relates to a reverse assist system for a saddle riding vehicle to assist a rider of the saddle riding vehicle in reversing the saddle riding vehicle.

When backing up a motorcycle, riders commonly apply the front brake and rapidly throw their weight forward with the front brake applied, effectively compressing the front suspension. Once the suspension starts to rebound the rider releases the front brake and uses the energy from the front suspension to propel the vehicle rearward. This sequence is repeated until the desired vehicle position is achieved. However, this method includes quite a few inputs from the rider, and its not uncommon for the rider to loose footing due to the seat height of the motorcycle or gravel under the rider feet.

SUMMARY

In accordance with one embodiment of the present disclosure, a reverse assist system for a saddle riding vehicle is disclosed. The saddle riding vehicle includes a front wheel and a front brake to apply brake to the front wheel. The reverse assist system includes a switch configured to be displaced between a first position and a second position. The switch is displaced to the second position to activate a reverse assist strategy. The reverse assist system also includes a sensing unit to determine at least one of a speed or an acceleration of the saddle riding vehicle, and a controller arranged in communication with the switch, the sensing unit, and the front brake. The controller is configured to activate the reverse assist strategy in response to the displacement of the switch to the second position, and control the front brake to control braking of the front wheel based on at least one of the speed or the acceleration of the saddle riding vehicle to assist a rider to reverse the saddle riding vehicle according to the reverse assist strategy.

In accordance with another embodiment of the present disclosure, a saddle riding vehicle is disclosed. The saddle riding vehicle includes a front wheel and a front brake to apply brake to the front wheel. The saddle riding vehicle further includes a switch configured to be displaced between a first position and a second position. The switch is displaced to the second position to activate a reverse assist strategy. Moreover, the saddle riding vehicle includes a sensing unit to determine at least one of a speed or an acceleration of the saddle riding vehicle, and a controller arranged in communication with the switch, the sensing unit, and the front brake. The controller is configured to activate the reverse assist strategy in response to the displacement of the switch to the second position, and control the front brake to control braking of the front wheel based on at least one of the speed or the acceleration of the saddle riding vehicle to assist a rider to reverse the saddle riding vehicle according to the reverse assist strategy.

In accordance with yet a further embodiment of the present disclosure, a method for assisting a rider in reversing a saddle riding vehicle is disclosed. The method includes activating a reverse assist strategy based on a position of a switch, and determining, by a controller, at least one of a speed or an acceleration of the saddle riding vehicle based on input from a sensing unit. The method further includes controlling, by the controller, a front brake of the saddle riding vehicle based on at least one of the speed or the acceleration of the saddle riding vehicle to assist the rider to reverse the saddle riding vehicle according to the reverse assist strategy.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-3, wherein like numbers indicate the same or corresponding elements throughout the views.

Figure 1:
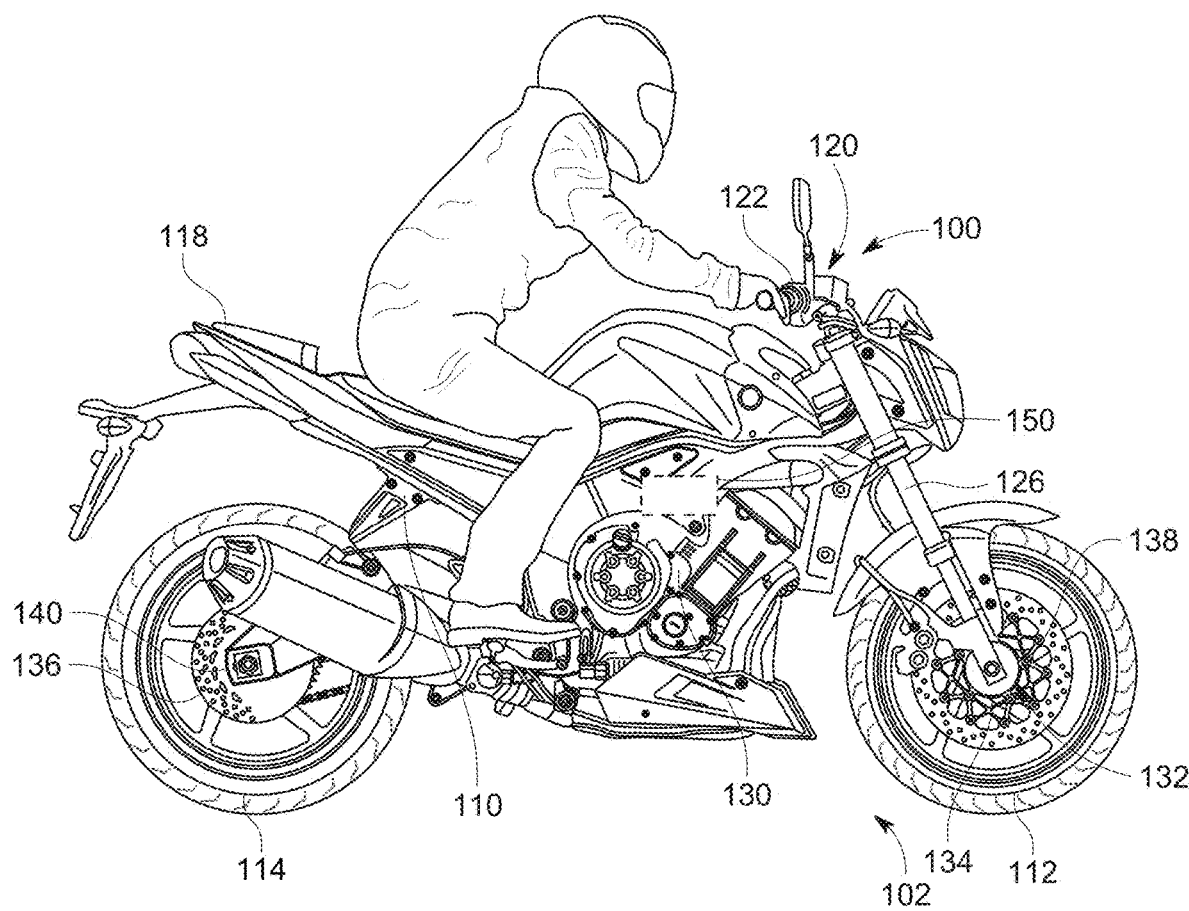
FIG. 1 is a side view of a saddle riding vehicle includes a reverse assist system, in accordance with one embodiment of the present disclosure.

FIG. 1 illustrates a perspective view of a saddle riding vehicle, indicated generally at 100, in accordance with one embodiment of the present disclosure. As shown, the saddle riding vehicle 100 is a motorcycle 102. Although the saddle riding vehicle 100 is contemplated as the motorcycle 102 it may be envisioned that the saddle riding vehicle 100 may be a scooter or any other similar vehicle known in the art.

As depicted in FIG. 1, the saddle riding vehicle 100 (hereinafter referred to as vehicle 100) includes a frame 110, a pair of wheels, for example, a front wheel 112 and a rear wheel 114, coupled to the frame 110 and adapted to rotate to enable a movement of the motorcycle 102 over a path, and a seat 118 supported on the frame 110 to facilitate a seating of at least one person on the vehicle. Further, the motorcycle 102 includes a handlebar assembly 120 having a handlebar 122, and a pair of suspension forks 126 extending downwardly from the steering tube and coupled to the front wheel 112. The steering tube is rotatably coupled to the frame 110 and the handlebar 122 is attached to the steering tube to enable a rotation of the steering tube by a rider to facilitate the steering of the motorcycle 102.

Further, the motorcycle 102 includes a power source 130, for example, an engine, operatively coupled to one of the wheels, for example, the rear wheel 114, to rotate the rear wheel 114 and propel the vehicle 100 in a forward direction. Although the vehicle 100 is contemplated as the engine powered vehicle, it may be appreciated that the vehicle 100 may include electric vehicle or a hybrid vehicle having both engine and electric motor as the power source. Also, the motorcycle 102 may include a transmission (not shown) coupling the power source 130 to the rear wheel 114 to transfer desired torque and speed to the rear wheel 114 from the power source 130. The transmission may be an automatic transmission or a manual transmission. The transmission transfers power received from the power source 130 to the rear wheel 114 to rotate the rear wheel 114 and propel the vehicle 100 over the road. The transmission may include a plurality of forward gears having corresponding gear ratios to provide a range of speed and torque outputs necessary for the vehicle 100 to travel over the road.

Moreover, the vehicle 100 includes a braking system 132 having a front brake 134 and a rear brake 136 to apply brakes to the front wheel 112 and the rear wheel 114, respectively. The front brake 134 includes one or more front brake devices 138 and the rear brake 136 includes one or more rear brake devices 140 to facilitate a braking and retarding of the vehicle 100. The front brake device 138 and the rear brake device 140 are operatively connected to the front wheel 112 and the rear wheel 114, respectively, and are selectively actuatable in response to displacement of a front brake lever and the rear brake lever, respectively, by the operator to apply a braking/retarding force to, respectively, apply the front brake 134 to the front wheel 112 and rear brake 136 to the rear wheel 114.

Figure 2:
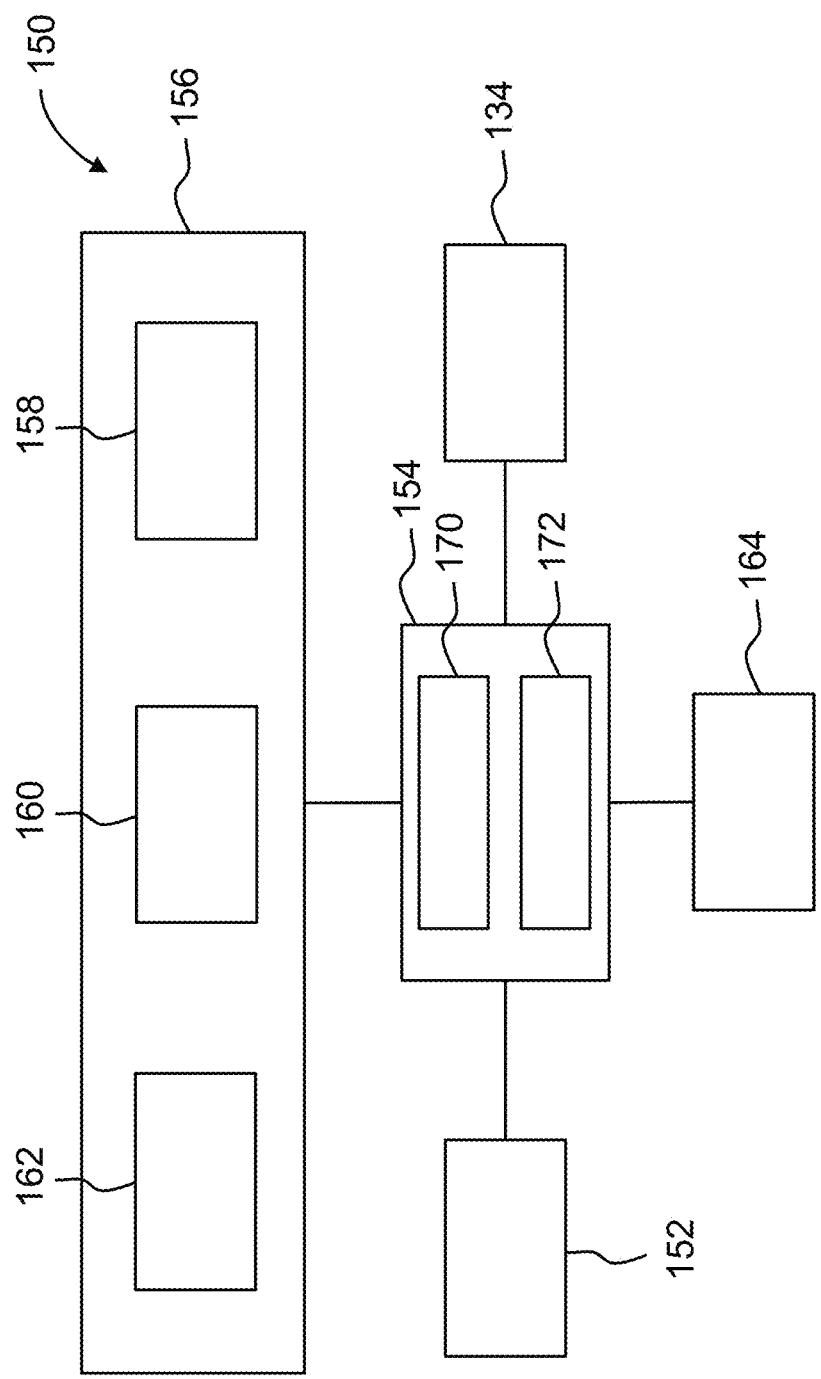
FIG. 2 is a schematic view of the reverse assist system, in accordance with one embodiment of the present disclosure.

Moreover, referring to FIG. 2, the vehicle 100 includes a reverse assist system 150 to assist a rider of the vehicle 100 in reversing (backing) the vehicle 100. In the embodiment, the reverse assist system 150 includes a switch 152 adapted to be operated by the rider to activate or deactivate a reverse assist strategy. Accordingly, the switch 152 is configured to be displaced between a first position and a second position by the rider to, respectively, activate and deactivate the reverse assist system 150. The switch 152 may be mounted to the handlebar 122 or any other location easily accessible to the rider while seated on the seat 118. Further, the reverse assist system 150 includes a controller 154 configured to control the front brake 134 and hence the front brake device 138 when the reverse assist strategy is active. The controller 154 may be an electronic control module (ECM) to receive information from various sensors and components of the vehicle 100 and control various subsystems, components of the vehicle 100. The controller 154 may be capable of processing the information received from a sensing unit 156, and outputting command and control signals to the power source 130, the transmission, the braking system 132, and various actuators of the vehicle 100.

The sensing unit 156 is configured to communicate with the controller 154 to provide one or more operational parameters of the vehicle 100 to the controller 154 to facilitate the controller 154 to operate one or more components of the vehicle 100 for performing the reverse assist strategy to reverse the vehicle 100.

In some implementations, the sensing unit 156 may include one or more sensors, for example, a speed sensor 158 to determine a speed of the vehicle 100, a direction sensor 160 to determine a direction of motion or heading of the vehicle 100, and an acceleration sensor 162 to determine an acceleration of the vehicle 100. In some embodiments, the one or more sensors may include an inertial sensor module (IMU) to determine one or more of the speed, direction of motion, and acceleration of the vehicle. In some embodiment, the sensing unit 156 may include virtual sensors to determine one or more of the speed, direction of motion, and acceleration of the vehicle 100. It may be appreciated that the acceleration sensor 162 is configured to determine a forward acceleration and a rearward acceleration of the vehicle 100. However, the vehicle 100 may include two separate acceleration sensors, one for determining forward acceleration and one for determining the rearward acceleration of the vehicle 100. Similarly, the speed sensor 158 is configured to determine a forward speed and a rearward speed of the vehicle 100. However, the vehicle 100 may include two separate speed sensors, one for determining forward speed and one for determining the rearward speed of the vehicle 100. Based on the input from the sensing unit 156 and the position of the switch 152, the controller 154 is configured to activate the reverse assist strategy and controls the front brake device 138 (i.e., front brake 134) to assist in reversing the vehicle 100 as per various steps of the reverse assist strategy.

Upon determination that the reverse assist strategy is activated by the user, the controller 154 is configured to determine the speed and acceleration of the vehicle 100 and checks if the forward speed of the vehicle is zero and/or the forward acceleration is below a threshold value. The controller 154 is configured to actuate the front brake device 138 to apply front brake 134 to the front wheel 112 if the forward speed is zero and/or the forward acceleration of the vehicle 100 is below the threshold value. Thereafter, the rider applies a forward force on the vehicle 100 to compress the suspension forks 126. In an embodiment, the vehicle 100 may include suitable sensors to determine an application of the forward force on the vehicle 100 and/or compression of the suspension forks 126. Upon application of the forward force by the rider, the controller 154 may again determine the forward speed and/or the forward acceleration of the vehicle 100. The controller 154 is configured to keep the front brake applied if the forward speed of the vehicle 100 is greater than zero and/or the forward acceleration is above or equal to the threshold value. Otherwise, the controller 154 may start a timer 164 in response to the forward speed being less than zero and/or the forward acceleration is below the threshold value.

Further, the controller 154 is configured to determine a rearward speed of the vehicle 100 and/or the rearward acceleration of the vehicle 100 when the timer ends. Subsequently, the controller 154 is configured to release the front brake 134 to allow a rearward motion of the vehicle 100 if the rearward speed of the vehicle is greater than or equal to zero and/or the rearward acceleration of the vehicle 100 is above the threshold value. Thereafter, the controller 154 is configured to apply the front brake 134 to the front wheel 112 when the rearward speed becomes equal to zero and/or rearward acceleration is less than the threshold value. After application of the front brake 134 to the front wheel, the controller 154 starts monitoring the forward acceleration and/or the forward speed of the vehicle 100 and release and applies front brake based on the speed and/or acceleration of the vehicle 100 in the forward and rearward direction until the switch 152 is arranged in the second position to assist in backing up the vehicle 100.

The controller 154 may include a processor 170 for executing specified instructions, which controls and monitors various functions associated with vehicle 100. The processor 170 may be operatively connected to a memory 172 for storing instructions related to the control of the vehicle 100 and vehicle components. In an embodiment, the memory 172 may also store various steps or instructions associated with the reverse assist strategy and operation of the vehicle 100 and the processor 170 is adapted to control one or more component of the vehicle 100, accordingly.

The memory 172 as illustrated is integrated into the controller 154, but those skilled in the art will understand that the memory 172 may be separate from the controller 154 but onboard the vehicle 100, and/or remote from the controller 154 and the vehicle 100, while still being associated with and accessible by the controller 154 to store information in and retrieve information from the memory 172 as necessary during the operation of vehicle 100. Although the processor 172 is shown, it is also possible and contemplated to use other electronic components such as a microcontroller, an application specific integrated circuit (ASIC) chip, or any other integrated circuit device. Moreover, the controller 154 may refer collectively to multiple control and processing devices across which the functionality of the drive control system and other systems of the vehicle 100 may be distributed. For example, the power source 130, the transmission, the braking system 132, and the sensing unit 156, may each have one or more controllers that communicate with the controller 154.

Figure 3:
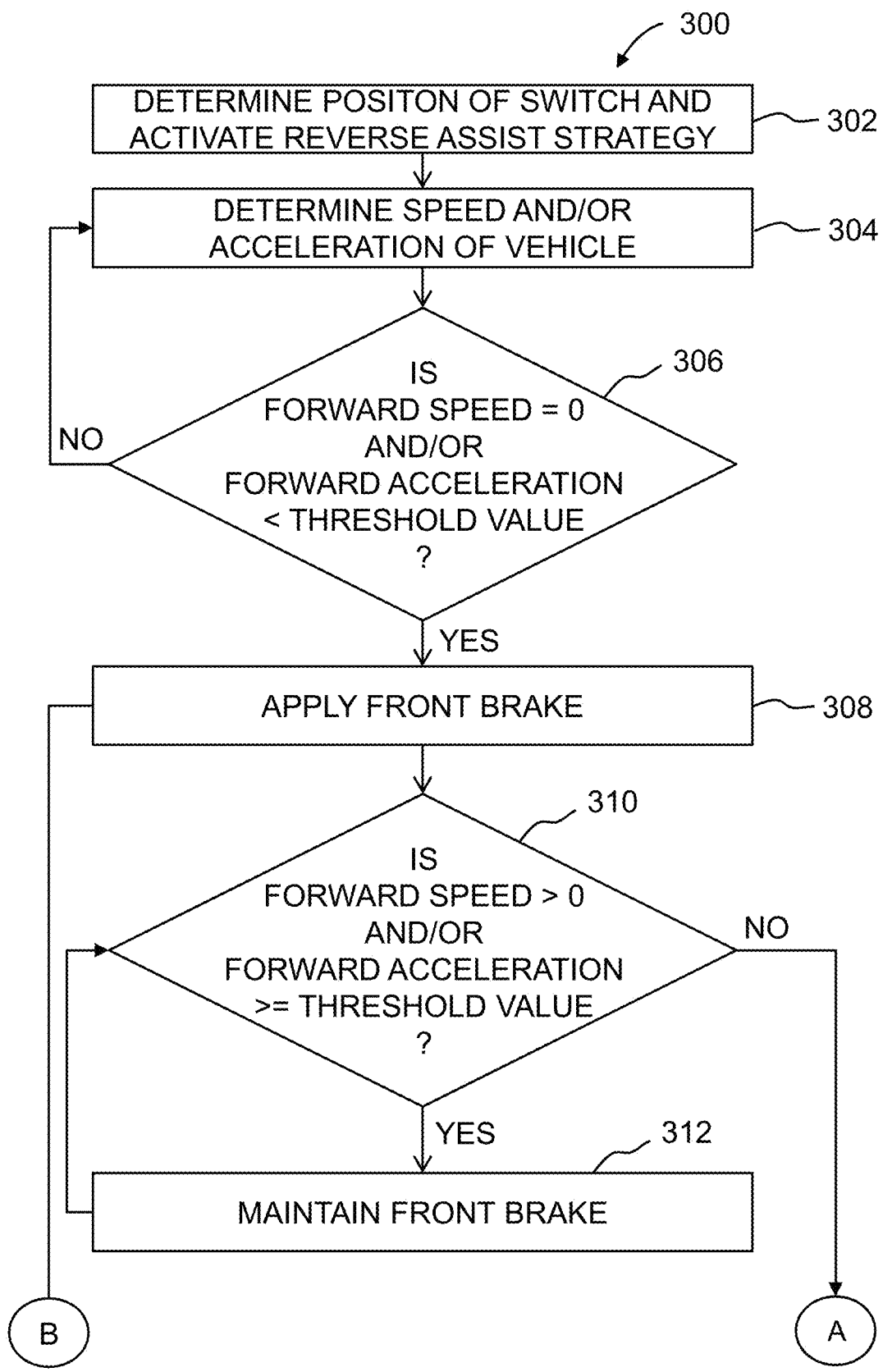
FIG. 3 depicts various steps of a method for assisting a rider in reversing the saddle riding vehicle, in accordance with one embodiment of the present disclosure.
Figure 3:
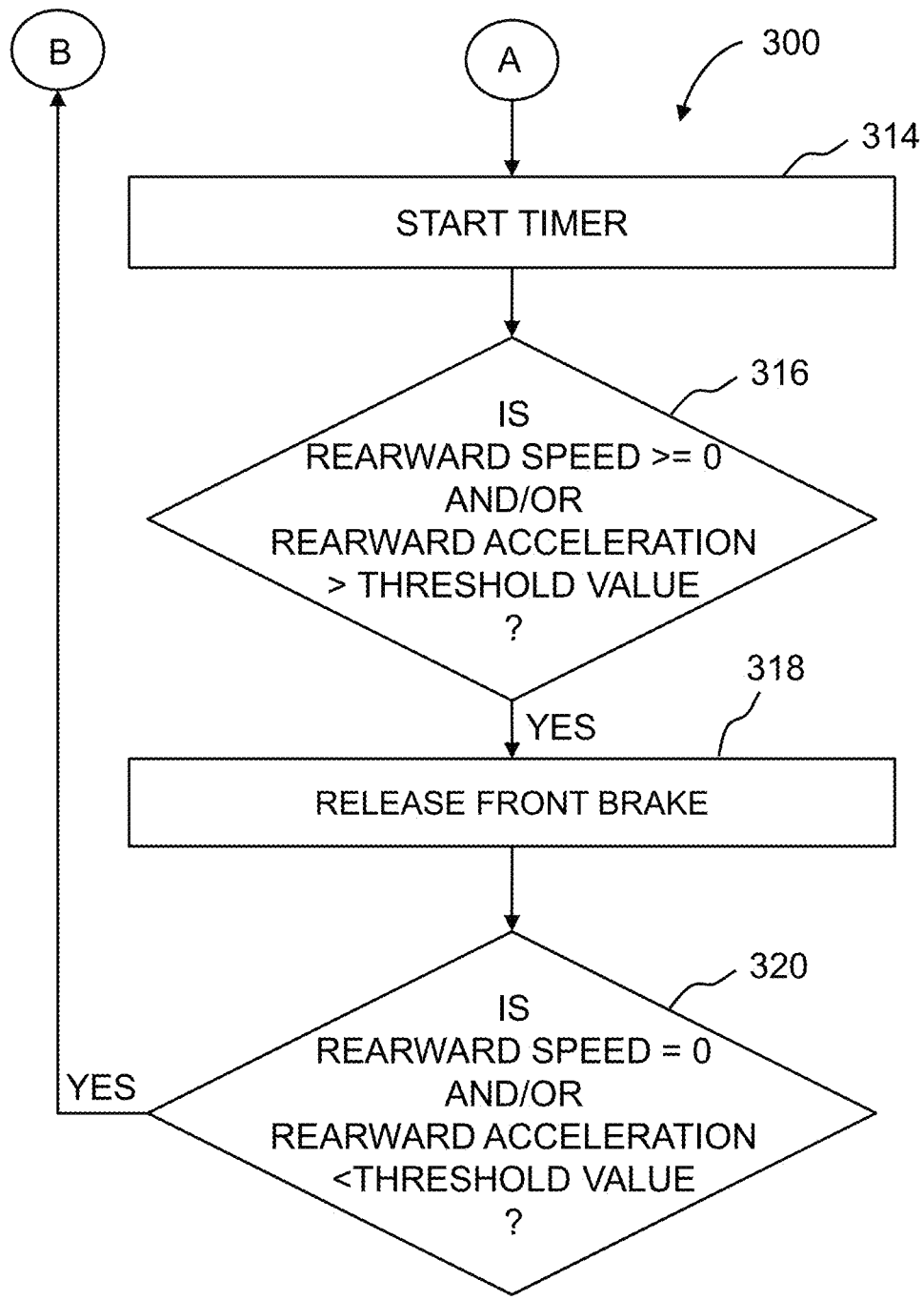

A method 300 of reversing the vehicle 100 is now explained with reference to FIG. 3. The method 300 includes a step 302, at which the controller 154 determines the position of the switch 152 and activates the reverse assist strategy when the controller 154 determines that the switch 152 is arranged at the second position. It may be appreciated that the rider displaces the switch 152 to the second position to enable the assistance while reversing the vehicle 100. Upon activation of the reverse assist strategy, the method 300 moves forward and controls the components of the vehicle 100, for example, the front brake 134 as per the various steps of the reverse assist strategy as described hereinafter.

At a step 304 of the method 300, the controller 154 determines a speed and/or an acceleration of the vehicle 100, and the method 300 moves to a step 306. At the step 306 of the method 300, the controller 154 check if the forward speed of the vehicle 100 is equal to zero and/or the forward acceleration of the vehicle 100 is below the threshold value. The method 300 moves to a step 308 if the forward speed of the vehicle 100 is zero and/or the forward acceleration is below the threshold value. At the step 308 of the method 300, the controller 154 actuates the front brake device 138 and actuates front brake 134 to apply the brake on the front wheel 112. Upon actuation/application of the front brake 134, the rider applies a forward force on the vehicle 100 to compress the suspension forks 126 of the vehicle 100. In an embodiment, the controller 154 may actuate/activate an indicator, for example, an audio and/or a light indicator, to indicate the rider that the front brake 134 has been actuated/applied and to prompt the rider to apply a forward force on the vehicle 100 to compress the suspension forks 126.

Thereafter, the method moves to a step 310, at which the controller 154 checks whether the forward speed of the vehicle 100 is greater than zero and/or the forward acceleration of the vehicle 100 is greater than or equal to the threshold value. Upon determination that the forward speed of the vehicle 100 is greater than zero and/or the forward acceleration of the vehicle 100 is greater than or equal to the threshold, the controller 154 maintains the front brake 134 actuated/applied, at a step 312 of the method 300. Subsequently, the method 300 moves back to the step 310.

The method 300 moves to a step 314 when the controller, at the step 310, the controller 154 determines that the forward speed of the vehicle 100 is zero or less than zero and/or forward acceleration of the vehicle 100 is less than the threshold value. At the step 314, the controller 154 starts a timer 164 and at the end of the timer 164, the method 300 moves to a step 316. At the step 316, the controller 154 determines a rearward speed and/or the rearward acceleration of the vehicle 100, and checks whether the rearward speed of the vehicle 100 is greater than or equal to zero and/or the rearward acceleration of the vehicle 100 is greater than the threshold value. The method 300 moves to a step 318 if the controller 154 determines that the rearward speed of the vehicle 100 is greater than or equal to zero and/or the rearward acceleration of the vehicle 100 is greater than the threshold value, else the controller 154 keeps monitoring the rearward speed and/or the rearward acceleration of the vehicle 100. At the step 318, the controller 154 deactivates/releases the front brake 134 to release braking of the front wheel 112, and the method 300 moves to a step 320. In response to the deactivation/release of the front brake 134, the vehicle 100 moves in the rearward direction. At the step 320, the controller 154 checks whether the rearward speed of the vehicle 100 is equal to zero and/or the rearward acceleration of the vehicle 100 is below the threshold value. The method 300 moves to the step 308 when the rearward speed of the vehicle 100 is equal to zero and/or the rearward acceleration of the vehicle 100 is below the threshold value, else the controller 154 keeps monitoring and comparing the rearward speed of the vehicle 100 and/or the rearward acceleration of the vehicle 100 as in the step 320. In this manner, the reverse assist system 154 and reverse assist strategy facilitates in reversing the vehicle 100, and reduces the effort of the rider as well as reduces the dependency on the skill of the rider.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A reverse assist system for a saddle riding vehicle having a front wheel and a front brake to apply brake to the front wheel, the reverse assist system comprising:
   a switch configured to be displaced between a first position and a second position, wherein the switch is displaced to the second position to activate a reverse assist strategy;
   a sensing unit to determine at least one of a speed or an acceleration of the saddle riding vehicle; and
   a controller arranged in communication with the switch, the sensing unit, and the front brake, and configured to
      activate the reverse assist strategy in response to the displacement of the switch to the second position,
      activate the front brake in response to at least one of a forward speed being equal to zero or a forward acceleration being below a threshold value upon activation of the reverse assist strategy,
      activate, by the controller, an indicator to prompt the rider to apply a forward force by compressing a front suspension fork of the saddle riding vehicle on the saddle riding vehicle upon activation of the front brake, and
      deactivate the front brake in response to at least one of the rearward speed of the vehicle being greater than zero or the rearward acceleration of the vehicle being above a threshold value upon application of the forward force by the rider on the saddle riding vehicle.

2. The reverse assist system of claim 1, wherein the reverse assist strategy includes
determining, by the controller, at least one of a rearward speed or a rearward acceleration of the vehicle upon application of the forward force by the rider on the vehicle.

3. The reverse assist system of claim 1, wherein the reverse assist strategy includes reactivating the front brake when at least one of the rearward speed of the vehicle is equal to zero or the rearward acceleration of the vehicle is below the threshold value.

4. The reverse assist system of claim 1, wherein the controller is configured to
determine at least one of a forward speed or a forward acceleration of the vehicle before determining at least one of the rearward speed or the rearward acceleration of the vehicle and upon application of the forward force on the vehicle.

5. The reverse assist system of claim 4, wherein the controller is configured to
start a timer upon determining that at least one of the forward speed is equal to zero or the forward acceleration is below the threshold value, and
determine at least one of the rearward speed or the rearward acceleration at an end of the timer.

6. A saddle riding vehicle, comprising:
a front wheel;
a front brake to apply brake to the front wheel;
a switch configured to be displaced between a first position and a second position, wherein the switch is displaced to the second position to activate a reverse assist strategy;
a sensing unit to determine at least one of a speed or an acceleration of the saddle riding vehicle; and
a controller arranged in communication with the switch, the sensing unit, and the front brake, and configured to
activate the reverse assist strategy in response to the displacement of the switch to the second position,
activate the front brake in response to at least one of a forward speed being equal to zero or a forward acceleration being below a threshold value upon activation of the reverse assist strategy,
activate an indicator to prompt the rider to apply a forward force by compressing a front suspension fork of the saddle riding vehicle on the saddle riding vehicle upon activation of the front brake, and
deactivate the front brake in response to at least one of the rearward speed of the vehicle being greater than zero or the rearward acceleration of the vehicle being above a threshold value upon application of the forward force by the rider on the saddle riding vehicle.

7. The saddle riding vehicle of claim 6, wherein the reverse assist strategy includes
determining, by the controller, at least one of a rearward speed or a rearward acceleration of the vehicle upon application of the forward force by the rider on the vehicle.

8. The saddle riding vehicle of claim 6, wherein the reverse assist strategy includes reactivating the front brake when at least one of the rearward speed of the vehicle is equal to zero or the rearward acceleration of the vehicle is below the threshold value.

9. The saddle riding vehicle of claim 6, wherein the controller is configured to
determine at least one of a forward speed or a forward acceleration of the vehicle before determining at least one of the rearward speed or the rearward acceleration of the vehicle and upon application of the forward force on the vehicle.

10. The saddle riding vehicle of claim 9, wherein the controller is configured to
start a timer upon determining that at least one of the forward speed is equal to zero or the forward acceleration is below the threshold value, and
determine at least one of the rearward speed or the rearward acceleration at an end of the timer.

11. A method for assisting a rider in reversing a saddle riding vehicle, the method comprising:
activating a reverse assist strategy based on a position of a switch;
determining, by a controller, at least one of a speed and an acceleration of the saddle riding vehicle based on input from a sensing unit;
activating, by the controller, the front brake in response to at least one of a forward speed being equal to zero or a forward acceleration being below a threshold value upon activation of the reverse assist strategy;
activating, by the controller, an indicator to prompt the rider to apply a forward force by compressing a front suspension fork of the saddle riding vehicle on the saddle riding vehicle upon activation of the front brake; and
deactivating, by the controller, the front brake in response to at least one of the rearward speed of the vehicle being greater than zero or the rearward acceleration of the vehicle being above a threshold value upon application of the forward force by the rider on the saddle riding vehicle.

12. The method of claim 11, wherein the reverse assist strategy includes
determining, by the controller, at least one of a rearward speed or a rearward acceleration of the vehicle upon application of the forward force by the rider on the vehicle.

13. The method of claim 11, wherein the reverse assist strategy includes reactivating the front brake when at least one of the rearward speed of the vehicle is equal to zero or the rearward acceleration of the vehicle is below the threshold value.

14. The method of claim 12, wherein the reverse assist strategy includes
determining at least one of a forward speed or a forward acceleration of the vehicle before determining at least one of the rearward speed or the rearward acceleration of the vehicle and upon application of the forward force on the vehicle,
starting a timer upon determining that at least one of the forward speed is equal to zero or the forward acceleration is below the threshold value, and
determining at least one of the rearward speed or the rearward acceleration at an end of the timer.

* * * * *